United States Patent [19]

Rieper

[11] Patent Number: 5,194,597
[45] Date of Patent: Mar. 16, 1993

[54] PREPARATION OF A COUPLING PRODUCT OF BISIAZOTIZED 2,2',5,5'-TETRACHLORO-4,4'-DIAMINOBIPHENYL WITH TWO EQUIVALENTS OF N-ACETOACETYL-2,4-DIMETHYLANILIDE

[75] Inventor: Wolfgang Rieper, Frankfurt am Main, Fed. Rep. of Germany

[73] Assignee: Hoechst AG, Frankfurt am Main, Fed. Rep. of Germany

[21] Appl. No.: 693,395

[22] Filed: Apr. 30, 1991

[30] Foreign Application Priority Data

May 2, 1990 [DE] Fed. Rep. of Germany ........ 4014022

[51] Int. Cl.$^5$ ................ C09B 35/035; C09B 67/20; C09D 11/62; D06P 1/44
[52] U.S. Cl. .................... 534/579; 534/581; 534/582; 534/747
[58] Field of Search ............... 534/581, 582, 747, 579

[56] References Cited

U.S. PATENT DOCUMENTS

| | | |
|---|---|---|
| 2,261,626 | 11/1941 | Lang .................................. 534/581 |
| 3,025,287 | 3/1962 | Ribka ................................. 534/747 |
| 3,112,303 | 11/1963 | Inman ............................. 534/581 X |
| 3,120,508 | 2/1964 | Braun et al. ..................... 534/747 X |
| 3,165,507 | 1/1965 | Braun et al. ..................... 534/581 X |
| 3,172,883 | 3/1965 | Inman ............................. 534/581 X |
| 3,444,157 | 5/1969 | Tanaka et al. .................. 534/747 X |
| 4,665,163 | 5/1987 | Hunger et al. .................. 534/747 X |

FOREIGN PATENT DOCUMENTS

| | | | |
|---|---|---|---|
| 26367/88 | 6/1989 | Australia ............................. 534/581 |
| 0319452 | 6/1989 | European Pat. Off. ............. 534/581 |
| 1088634 | 3/1961 | Fed. Rep. of Germany ...... 534/581 |
| 2108143 | 5/1983 | United Kingdom ................ 534/580 |

Primary Examiner—Floyd D. Higel
Attorney, Agent, or Firm—Connolly & Hutz

[57] ABSTRACT

The industrial preparation of C.I. Pigment Yellow 81 by conventional coupling methods has the disadvantage that traces of polychlorinated biphenyls are formed in the course of the reaction of the two components.

The invention now provides that the addition of quaternary dialkyldiallylammonium compounds during the azo coupling will decisively suppress the PCB-forming secondary reactions during the pigment synthesis.

4 Claims, No Drawings

PREPARATION OF A COUPLING PRODUCT OF BISIAZOTIZED 2,2',5,5'-TETRACHLORO-4,4'-DIAMINOBIPHENYL WITH TWO EQUIVALENTS OF N-ACETOACETYL-2,4-DIMETHYLANILIDE

The present invention relates to the preparation of C. I. Pigment Yellow 81 (No. 21127) having a particularly low PCB content.

Disazo pigments based on tetrachlorodiaminobiphenyl compounds may contain a certain proportion of polychlorinated biphenyls (PCBs) as impurities (W. Herbst and K. Hunger in "Industrielle Organische Pigmente", VCH-Verlag, Weinheim 1987, page 578). This is true in particular of pigments of this type which have been produced by conventional industrial processes, the PCB contents of which frequently exceed the limits allowed by the law in commercial products. For instance, in the USA the maximum permissible level of polychlorinated biphenyls is limited to 25 micrograms per gram of pigment.

This has led to the development of improved synthesis techniques for ultrapure azo pigments:

Published European Patent Application EP-A-0 319 452 thus describes monoazo pigments having an extremely low polychlorinated biphenyl content (not more than 25 μg/g) and their preparation from di- and trichloroanilines. The coupling parameters to be observed in this specific case of pigment production relate in particular to admissible molar excesses of diazonium salt, based on the total number of moles of coupling component present in the reaction mixture and of pigment already formed, the limits for the excess of diazonium salt being determined by the pH of the coupling reaction. Further obligatory requirements of this method of synthesis are a pH below 7, an upper coupling temperature limit of 50° C. and the strict exclusion of nitrite ions during the coupling reaction, and additionally the method is restricted to just two of the otherwise customary coupling variants in which either the diazonium salt solution is added to the suspension or solution of the coupling component or else the solutions or suspensions of the two reactants are brought together simultaneously.

It is known from experience that the preparation of ultrapure monoazo or disazo pigments is not possible either by "indirect" coupling, where the alkaline solution of the coupling component is added to the diazonium salt solution or suspension, or by the "pendulum coupling" method, where the required pH of the coupling reaction is maintained by the continuous or intermittent addition of alkali (usually dilute sodium hydroxide solution) to the reaction mixture.

However, it is precisely the last-mentioned variant of pendulum coupling which is frequently practiced in the industrial production of azo pigments, in particular when high acid excesses (for example in the diazotization of weakly basic amines or diamines) need to be neutralized to obtain a favorable pH for the coupling reaction. By adding alkali during the azo coupling it is possible to save the otherwise necessary appreciable buffer quantities.

It has now been found that the preparation of the coupling product of bisdiazotized 2,2',5,5'-tetrachloro-4,4'-diaminobiphenyl on two equivalents of N-acetoacetyl-2,4-dimethylanilide will give a disazo pigment whose PCB content does not meet the toughest legislation (i.e. not more than 25 μg of PCB/g of product) despite careful compliance with the reaction parameters defined in EP-A-0 319 452. More particularly, if the preferred pendulum coupling technique is applied to the yellow pigment mentioned the level of polychlorinated biphenyl impurities will frequently be above 100 μg/g of pigment.

It was therefore particularly desirable to develop an industrially practicable synthesis process for preparing C. I. Pigment Yellow 81 by azo coupling wherein the formation of PCBs is substantially prevented or at any rate the PCB level is reduced to not more than 25 μg/g.

The present invention, then, provides a process for preparing C. I. Pigment Yellow 81 of C.I. No. 21127 (CAS No. 22094-93-5) which contains not more than 25 μg of polychlorinated, i.e. at least tetrachlorinated, biphenyls (PCBs) per gram of pigment, in which the azo coupling is brought about in aqueous medium at a pH or within a pH range less than pH 7, especially between pH 3.0 and 6.0, either by addition of the diazonium salt solution to a suspension of the coupling component or by the simultaneous addition of the two reactants (pigment-forming components) to a reaction vessel, which comprises effecting the coupling operation in the presence of a quaternary ammonium salt of the structural formula I

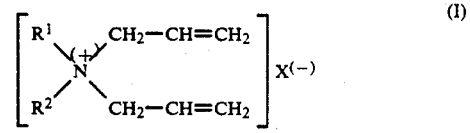

where $R^1$ and $R^2$ are each independently of the other $C_1$–$C_3$-alkyl and X is chlorine, bromine or iodine, in particular in the presence of dimethyldiallylammonium chloride.

The particular quantities of the quaternary ammonium salts of the formula I to be used according to the present invention vary between 1 and 10% by weight, preferably from 2 to 5% by weight, based on the amount of the yellow pigment formed in the course of the reaction. The addition of the ammonium compound advantageously takes place before, during or after the preparation of the suspension of the coupling component, but the quaternary salt can also be added to the diazonium salt solution or to the hydrochloride of the starting material tetrachlorobenzidine before the bisdiazotization thereof.

No further assistants need be used in the azo coupling, since the quaternary salt used according to the present invention already has a sufficient surface-active effect.

The PCB-reducing effect of the diallyldialkylammonium compound of the formula I in the preparation of C. I. Pigment Yellow 81 is surprising and was not foreseeable. If as usual a nonionic surfactant (for example the reaction product of ethylene oxide with oleyl alcohol; German Patent Specification DE-C-1 088 634 cf. the illustrative embodiment) is used in the coupling of the pigment, coupling products with PCB contents of around 100 μg/g or more are obtained. Similarly, anionic surfactants (for example alkanesulfonates) do not significantly reduce the PCB level of the pigment. Even tetraalkylammonium salts having the same number of carbon atoms as the dimethyldiallylammonium chloride of the formula I (e.g. tetraethylammonium bromide or dimethyldipropylammonium chloride) used according to the present invention have a distinctly smaller effect on the reduction of the level of polychlorinated biphenyls in the pigment.

Of particular practical importance is the fact that the positive effect of the diallyl compounds of the formula I on the reduction of the level of PCBs in C. I. Pigment Yellow 81 is obtained even when in an industrial production of the disazo pigment without high wastewater-polluting buffer levels the pH of the coupling reaction is controlled by the above-described pendulum coupling technique.

The PCB contents reported above and in the Examples, in respect of pigment samples are based on an analytical method for the quantitative detection of PCB impurities, including the portions bound occlusively and adsorptively to the pigment. It involves dissolving a sample of the pigment to be analyzed in concentrated sulfuric acid and then transferring the chlorinated biphenyls in a combined extraction/purification process (for example by chromatography) to an apolar solvent such as an aliphatic hydrocarbon, in particular n-hexane. In the organic solution obtained the PCB content is then determined quantitatively by known methods, for example by gas chromatography, as described for example in more detail at the end of Example 1.

The yellow azo pigment prepared by the process of the present invention can be used for coloring natural and synthetic materials.

It is suitable in particular for pigmenting printing inks for letterpress/offset printing, intaglio printing, flexographic printing and other specific printing processes, for preparing pigmented lacquers based on oxidatively drying or oven-drying systems, for preparing disperse paints, for pigmenting plastics such as for example polyvinyl chloride, polyolefins, polystyrenes and copolymers thereof, polymethyl methacrylates, polyurethanes, polycarbonates, polyesters, cellulose derivatives, elastomers or thermosets, and also as a colorant for spin dyeing. The yellow pigment can also be used for more specific applications, for example as colorant for electrophotographic toners, for ink jet processes or for heat transfer ribbons.

In the Examples which follow, parts and percentages are by weight unless otherwise stated. Parts by volume bear the same relation to parts by weight as the liter to the kg.

EXAMPLE 1

32.2 parts of 2,2'5,5'-tetrachloro-4,4'-diaminobiphenyl are stirred in a mixture of 85 parts by volume of water and 85 parts by volume of 30% strength hydrochloric acid for 8 hours. The resulting diamine hydrochloride is then diazotized at 0-10° C. by the dropwise addition of 27 parts by volume of a 40% strength aqueous sodium nitrite solution. After the diazotization has ended, the resulting bisdiazonium salt solution is diluted with water to 400 parts by volume and filtered following the addition of diatomaceous earth, and any excess of nitrous acid present in the filtrate is destroyed by means of amidosulfuric acid.

In a second vessel, 42 parts of N-acetoacetyl-2,4-dimethylaniline are suspended in 600 parts by volume of water and dissolved with 20 parts by volume of 33% strength sodium hydroxide solution. The clear solution obtained is then cooled down to 10° C., 3.5 parts of a 60% strength aqueous solution of dimethyldiallylammonium chloride are added, and the coupling component is then precipitated by rapidly adding 14 parts by volume of glacial acetic acid while stirring.

The coupling itself takes place by adding the above bisdiazonium salt solution to the suspension of the coupling component at 15-20° C. over 2 to 2.5 hours. As soon the reaction mixture pH has dropped from initially 5.6-5.4 to pH 4.0-3.8 (i.e. after about 30 to 40 minutes), the dropwise addition is started of 6% strength sodium hydroxide solution to maintain the pH at 3.8 during the reaction. After all the diazonium salt solution has been added and as soon as spot tests with H-acid show that there are no longer any diazonium ions present, the reaction mixture is briefly heated to 95° C. and the precipitated azo pigment is then filtered off, washed salt-free with water and dried at 60° C.

To determine the level of polychlorinated biphenyls, a powder sample of the resulting C. I. Pigment Yellow 81 (No. 21127) coupling product is first admixed with a standard solution of two known chlorinated biphenyls and dissolved in approximately 96% strength sulfuric acid, and the resulting solution is mixed in the combined extraction/purification process described hereinafter with an amount of silica gel such that the latter remains This mixture (of adsorbent plus in-test substance) is then transferred to a customary chromatography tube which has beforehand been charged with two differently pretreated silica gel purification zones (a KOH-loaded silica gel layer above an oleum-loaded silica gel layer) and is then eluted with n-hexane. In the eluate the polychlorinated biphenyls are quantitatively determined following gas-chromatographic separation in a capillary column by ECD (electron capture detection) or mass-selective detection against an internal PCB standard.

The amounts of PCB found were 20 μg, based on 1 g of pigment (20 ppm of PCB).

The sample can also be quantified by other analytical methods, for example HPLC (high pressure liquid chromatography).

EXAMPLE 2

(COMPARATIVE TEST)

On repeating Example 1 in the absence of dimethyldiallylammonium chloride and instead using 25 parts by volume of a 10% strength aqueous solution of the condensation product of oleyl alcohol with 20 equivalents of ethylene oxide as assistant in the precipitation of the coupling component, the resulting disazo coupling product C. I. Pigment Yellow 81 had a polychlorinated biphenyls content of 107 μg/g (107 ppm).

EXAMPLE 3

(COMPARATIVE TEST)

On using a secondary alkanesulfonate (carbon chain length of about 60% of $C_{13}$-$C_{15}$ and 40% of $C_{15}$-$C_{17}$) as assistant in the coupling instead of the nonionic surfactant described in Example 2 the C. I. Pigment Yellow 81 was obtained with a 78 μg/g PCB content.

EXAMPLES 4 AND 5

(COMPARATIVE TEST)

On replacing the quaternary ammonium salt mentioned in Example 1 either by 3 parts of tetraethylammonium bromide or by 25 parts of a 10% strength aqueous solution of dimethyldipropylammonium chloride and carrying out the couplings exactly under the experimental parameters of Example 1, the pigment samples obtained were found to contain between 45 and 55 μg of polychlorinated biphenyls/g as impurities.

EXAMPLE 6
(COMPARATIVE TEST)

32.2 parts of 2,2',5,5'-tetrachloro-4,4'-diaminobiphenyl were diazotized as described in Example 1 and 42 parts of N-acetoacetyl-2,4-dimethylaniline were dissolved under alkaline conditions as described therein. Following the addition of 30 parts by volume of a 10% strength aqueous solution of the reaction product of stearyl alcohol with 25 equivalents of ethylene oxide, the coupling component was precipitated in finely divided form with 14 parts by volume of glacial acetic acid. The azo coupling in turn was effected by adding the bisdiazonium salt solution to the suspension of the acetoacetarylide while the pH was maintained within the range from 4.5 to 4 by the portionwise addition of about 80 parts of crystalline sodium acetate. The coupling product was worked up as described in Example 1. The disazo pigment obtained by this method had a PCB content of 96 μg/g.

What is claimed is:

1. A process for preparing the coupling product of bisdiazotized 2,2',5,5'-tetrachloro-4,4'-diaminobiphenyl with two equivalents of N-acetoacetyl-2,4-dimethylanilide which contains not more than 25 μg of polychlorinated biphenyls (PCBs) per gram of pigment, in which the azo coupling is brought about in aqueous medium at a pH of within a pH range of less than pH 7 either by addition of the diazonium salt solution to a suspension of the coupling component or by the simultaneous addition of the two reactants to a reaction vessel, which comprises effecting the coupling operation in the presence of at least one quaternary ammonium salt of the structural formula

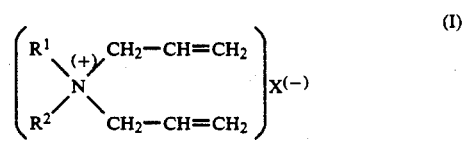

where $R^1$ and $R^2$ are each independently of the other $C_1$–$C_3$-alkyl and X is chlorine, bromine or iodine.

2. The process of claim 1, wherein the quaternary ammonium salt is dimethyldiallyl-ammonium chloride.

3. The process of claim 1, wherein the quaternary ammonium salt is sued in an amount between 1 and 10% by weight, based on the amount of pigment formed in the course of the coupling.

4. The process of claim 1, wherein the amount of quaternary ammonium salt used is from 2 to 5% by weight.

* * * * *